US012353382B2

(12) United States Patent
Deshpande et al.

(10) Patent No.: US 12,353,382 B2
(45) Date of Patent: Jul. 8, 2025

(54) MANAGEMENT OF INDEXED DATA TO IMPROVE CONTENT RETRIEVAL PROCESSING

(71) Applicant: Microsoft Technology Licensing, LLC, Redmond, WA (US)

(72) Inventors: Saurabh Sanjay Deshpande, Sammamish, WA (US); Mina Mikhail, Bothell, WA (US); Matthew Francis Hurst, Seattle, WA (US); Riham Hassan Abdel-Moneim Mansour, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 399 days.

(21) Appl. No.: 18/062,991

(22) Filed: Dec. 7, 2022

(65) Prior Publication Data

US 2023/0096647 A1    Mar. 30, 2023

Related U.S. Application Data

(63) Continuation of application No. 16/721,652, filed on Dec. 19, 2019, now Pat. No. 11,544,502.

(51) Int. Cl.
*G06K 9/62* (2022.01)
*G06F 16/22* (2019.01)
(Continued)

(52) U.S. Cl.
CPC ........ *G06F 16/2228* (2019.01); *G06F 16/22* (2019.01); *G06F 16/2272* (2019.01);
(Continued)

(58) Field of Classification Search
CPC ............... G06F 16/2228; G06F 16/22; G06F 16/2272; G06F 20/00; G06F 16/24549; G06F 18/2148
See application file for complete search history.

(56) References Cited

U.S. PATENT DOCUMENTS

| 2016/0203174 | A1* | 7/2016 | Shahane | ............ G06F 16/2228 707/803 |
| 2018/0089258 | A1* | 3/2018 | Bhattacharjee | ... G06F 16/24535 |

OTHER PUBLICATIONS

"ARR Affinity in Azure App Service", Retrieved From: https://joonasw.net/view/arr-affinity-in-azure-app-service, Jun. 24, 2016, 3 Pages.

* cited by examiner

*Primary Examiner* — Quang N Vo

(57) ABSTRACT

The present disclosure relates to processing operations configured to uniquely utilize indexing of content to improve content retrieval processing, particularly when working with large data sets. The techniques described herein enables efficient content retrieval when working with large data sets such as those that may be associated with a plurality of tenants of a data storage application/service. Among other technical advantages, the present disclosure is applicable to train a classifier using relevant samples based on text search in tenant-specific scenarios, where accurate searching can be executed for content associated with one or more tenant accounts of an application/service concurrently in milliseconds even in instances where there may be millions of documents to be searched. As an example, exemplary data shards may be generated and managed for efficient and scalable content retrieval processing including training of a classifier (e.g., artificial intelligence classifier) and real-time (or near real-time) query processing.

20 Claims, 4 Drawing Sheets

(51) Int. Cl.
*G06F 16/2453* (2019.01)
*G06F 18/214* (2023.01)
*G06N 20/00* (2019.01)

(52) U.S. Cl.
CPC .... *G06F 16/24549* (2019.01); *G06F 18/2148* (2023.01); *G06N 20/00* (2019.01)

100

200

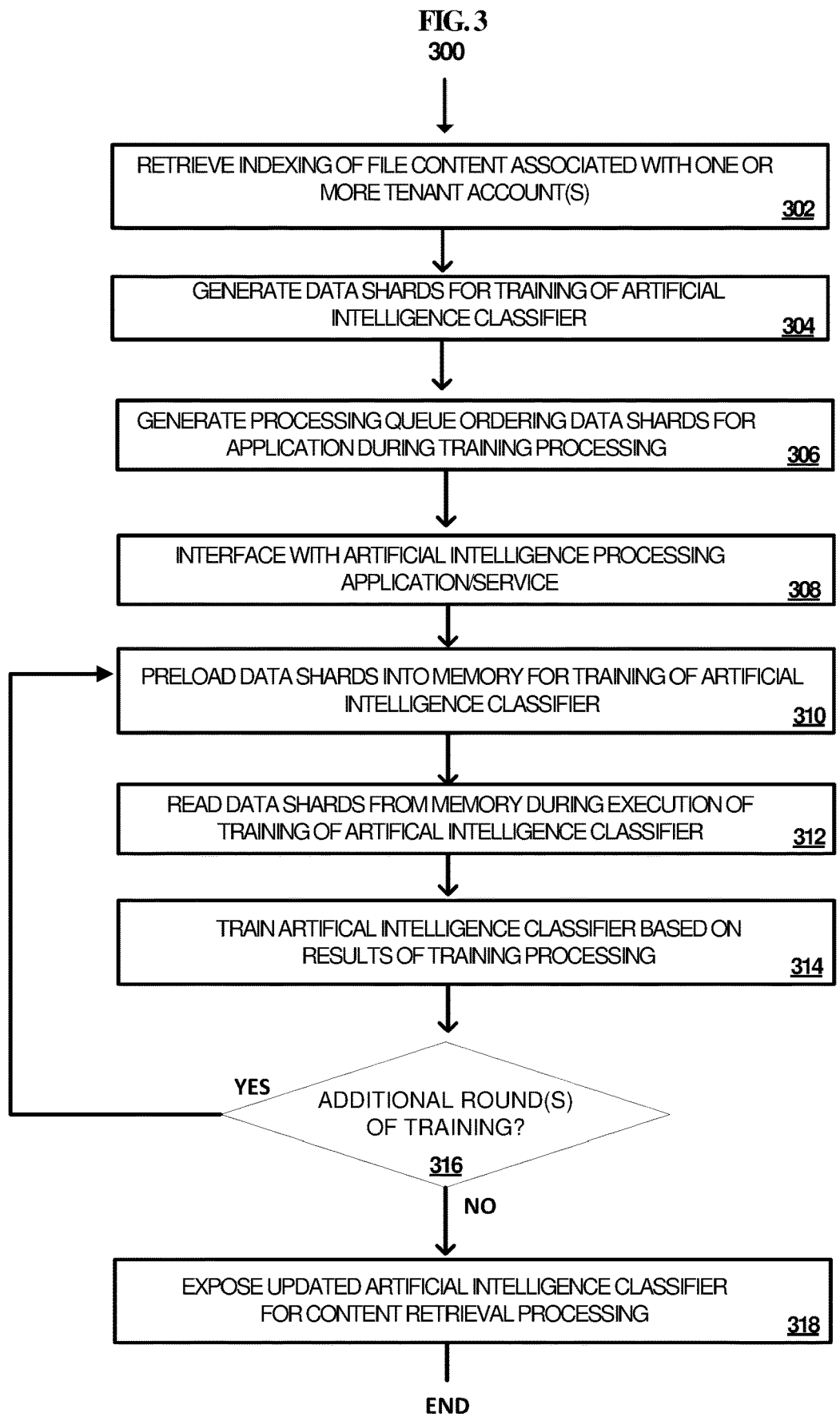

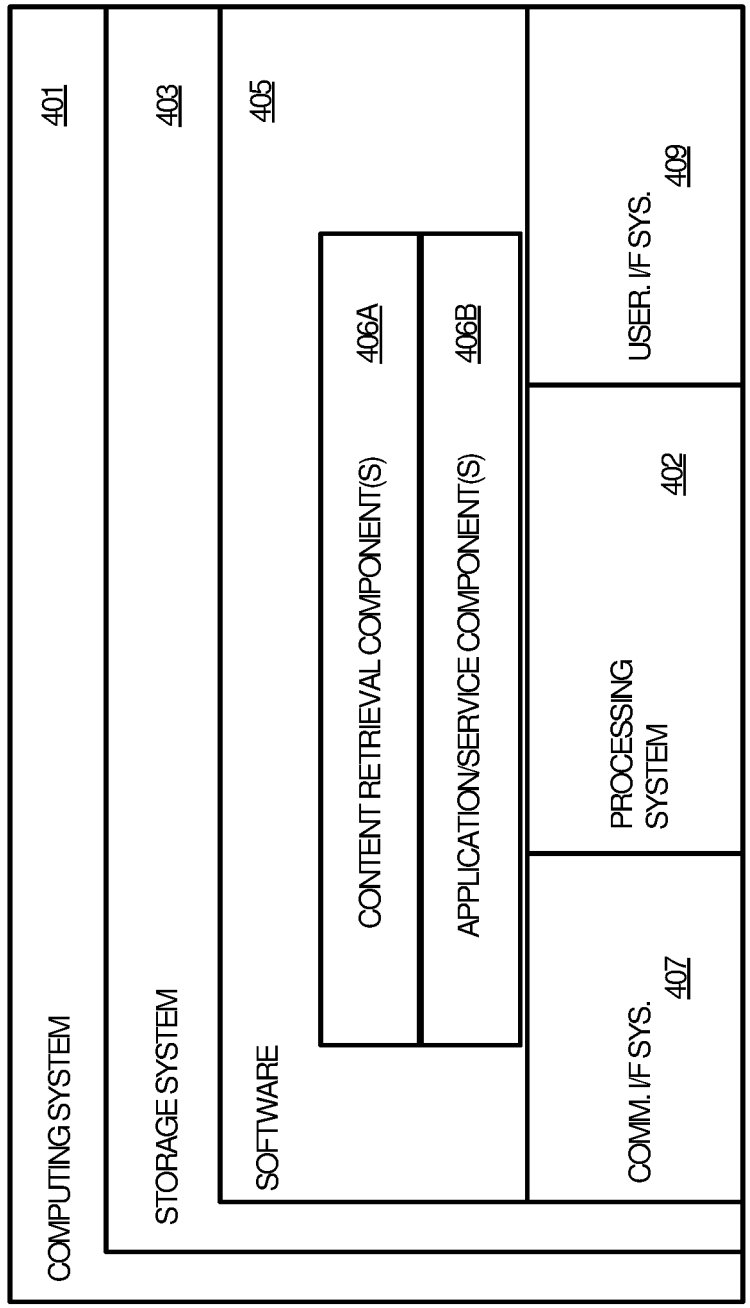

MANAGEMENT OF INDEXED DATA TO IMPROVE CONTENT RETRIEVAL PROCESSING

CROSS REFERENCE TO RELATED APPLICATIONS

This application is a continuation of and claims the benefit of and priority to U.S. patent application Ser. No. 16/721,652, filed Dec. 19, 2019, entitled "MANAGEMENT OF INDEXED DATA TO IMPROVE CONTENT RETRIEVAL PROCESSING," which is incorporated herein by reference in its entirety for all purposes.

BACKGROUND

Sampling of a large data set has many applications, one of the most important ones being to train classification models. Search sampling is an effective technique for content labeling, classification and training, especially in bootstrap scenarios. To support quick search over documents, indexing of content may be a popular pre-processing step. While indexing alone may work well for a small set of documents, additional processing is required when working with large data sets because results of indexing processing alone are not scalable. From a processing standpoint, indexing alone for content retrieval in large data scenarios may lack accuracy, reduce processing efficiency and increase latency when attempting to return classification results. In some technical instances, an indexing application or service may be utilized to create indexes of content. However, indexing applications/services are configured only for creation of indexes of content and are often unaware of how those created indexes may be further utilized or applied. As such, there are technical challenges that need to be resolved when attempting to use indexing for content retrieval in large data scenarios.

SUMMARY

In view of the foregoing technical challenges, the present disclosure relates to processing operations configured to uniquely utilize indexing of content to improve content retrieval processing, particularly when working with large data sets. The techniques described herein enables efficient content retrieval when working with large data sets such as those that may be associated with a plurality of tenants of a data storage application/service. Among other technical advantages, the present disclosure is applicable to train a classifier using relevant samples based on text search in tenant-specific scenarios, where accurate searching can be executed for content associated with one or more tenant accounts of an application/service concurrently in milliseconds even in instances where there may be millions of documents to be searched. As an example, exemplary data shards may be generated and managed for efficient and scalable content retrieval processing including training of a classifier (e.g., artificial intelligence classifier) that is used for various applications (Language Understanding, content retrieval, etc.). Artificial intelligence processing is executed that utilizes an optimized classifier for content retrieval, for example, in tenant-specific scenarios (e.g., searching content for one or more tenant accounts of an application/service). In further examples, the data shards may be pre-loaded for tenant-specific searching of documents in real-time (or near real-time), where we can expedite labeling and training of our classifier.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 3 illustrates an exemplary method related to the generation and management of data shards (or groupings thereof) that are usable for content retrieval processing, as described herein, with which aspects of the present disclosure may be practiced.

FIG. 4 illustrates a computing system suitable for implementing processing operations described herein related to content retrieval processing using exemplary data shards (or groupings thereof) as described herein, with which aspects of the present disclosure may be practiced.

DETAILED DESCRIPTION

Figure 1:
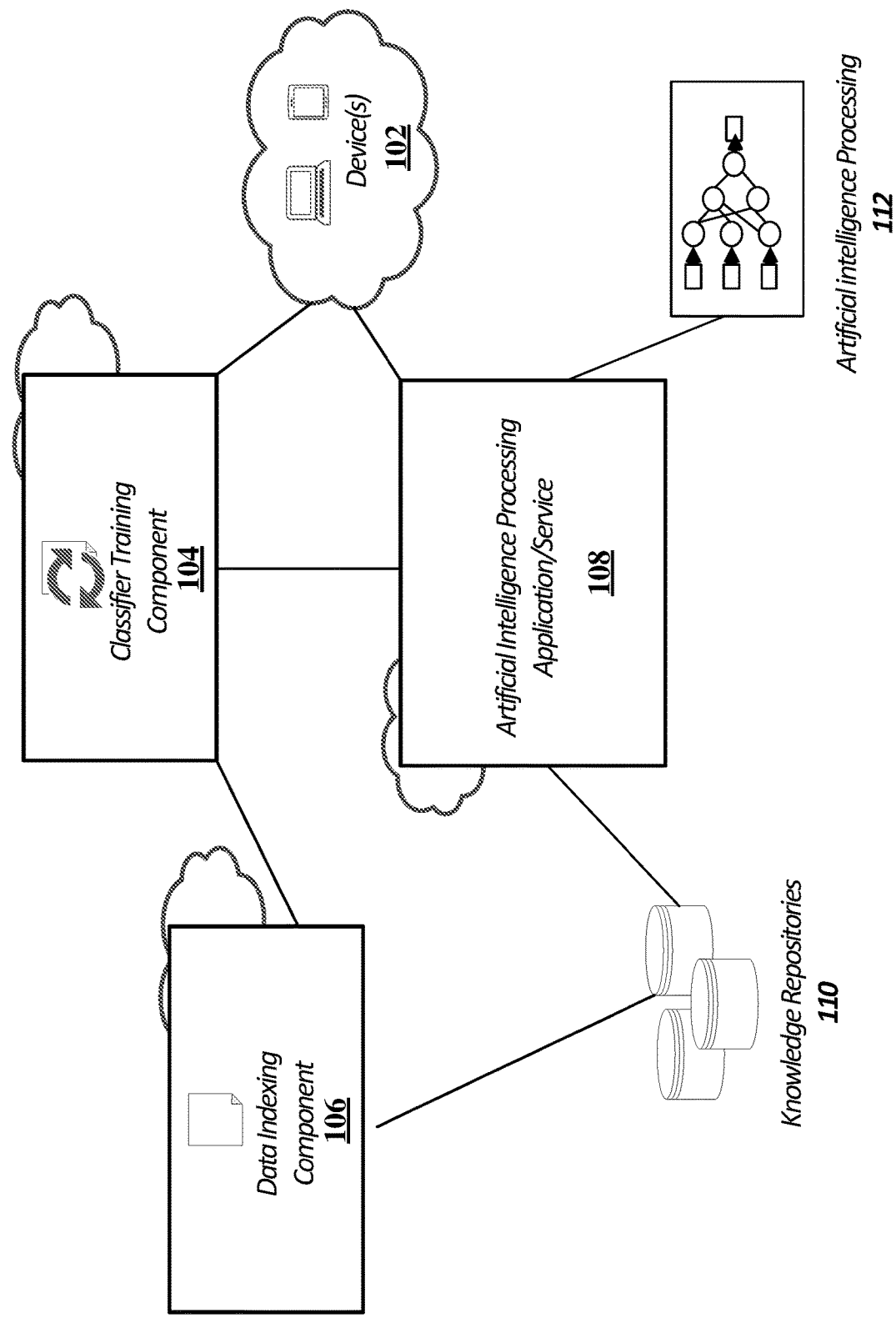
FIG. 1 illustrates an exemplary system diagram providing an interaction between components that are configured to enable improved processing during content retrieval as described herein, with which aspects of the present disclosure may be practiced.

As referenced above, the present disclosure relates to processing operations configured to uniquely utilize indexing of content to improve content retrieval processing, particularly when working with large data sets. The techniques described herein enables efficient content retrieval when working with large data sets such as those that may be associated with a plurality of tenants of a data storage application/service. Among other technical advantages, the present disclosure is applicable to label content and train a classifier in tenant-specific scenarios, where accurate searching can be executed for one or more tenant accounts of an application/service (e.g., tenant-specific content search or multi-tenant content search) concurrently in milliseconds even in instances where there may be millions of documents to be searched. As an example, exemplary data shards may be generated and managed for efficient and scalable content retrieval processing including training of a classifier (e.g., artificial intelligence classifier). In further examples, the data shards may pre-loaded for tenant-specific searching of documents in real-time (or near real-time), which further expedites the training process. For example, exemplary data shards may be pre-loaded into a memory of a computing device before a tenant of an application/service executes searching/content retrieval of content (e.g., their stored documents). When the tenant executes a search query for content retrieval, the created data shards may be searched based on cached data on disk to improve processing efficiency and accuracy during content retrieval processing.

Content associated with tenant accounts of an application/service may be indexed. Indexing for content of tenant accounts may be utilized to create exemplary data shards, which are used to search and label content, and train a classifier that executes artificial intelligence processing. An exemplary data shard is a data container of a predetermined size that contains index files that correlate with a randomized sampling of content of a tenant account. In generating data shards, manageable-sized representations of data sets are created that are reflective of a normal distribution of documents for a data source. A plurality of data shards may be created that represent file content associated with a tenant account. Groupings of data shards may be created for tenants, which are loaded into memory on the fly to enable tenant-specific search, labelling and training of a classifier. In some examples, data shards for respective tenants may be processed sequentially, iteratively or concurrently (e.g., in parallel). In further examples, training shards for multiple tenants may be processed concurrently.

Further examples described herein extend to management of exemplary data shards to improve efficiency during classifier training. As an example, data shards used during classifier training may be preloaded into a memory of a computing resource upon which the classifier training is executed. An exemplary processing queue may be utilized to manage loading and unloading of data shards from memory during classifier training and/or content retrieval processing. For instance, data shards may be pre-loaded into memory for fast and efficient content retrieval processing in response to a trigger such as: identification of tenant access to an operating system (OS) or application/service; access/initiation to a graphical user interface (GUI) prompt enabling entry of a search query; or initiation of training processing (e.g. through an artificial intelligence processing application/service), among other examples. Moreover, load balancing may be executed for managing computing resources allocated to training of an exemplary classifier. This may further improve processing efficiency during technical scenarios such as execution of training of a classifier or real-time (or near real-time) search and retrieval.

Exemplary technical advantages provided by processing described in the present disclosure comprise but are not limited to: providing a scalable and extensible solution for improving content retrieval (and training of a classifier used for content retrieval) when working with large data sets; utilization of data indexing to create data shards providing an exemplary randomized sampling of content for training purposes; reducing privacy concerns when utilizing tenant data for training of a classifier for content retrieval; improving processing efficiency (e.g., reduction in processing cycles, saving resources/bandwidth) for computing devices when executing training of a classifier for content retrieval and/or real-time (or near real-time) content retrieval processing; improving memory management during content retrieval training and/or real-time processing of a search query; reduction in latency when training a classifier for content retrieval and/or real-time (or near real-time) content retrieval processing; and improving usability of applications/services when executing content retrieval processing, among other technical advantages.

FIG. 1 illustrates an exemplary system diagram 100 providing an interaction between components that are configured to enable improved processing during content retrieval as described herein. System diagram 100 comprises: computing device(s) 102; a classifier training component 104; a data indexing component 106; an artificial intelligence processing application/service 108; knowledge repositories 110; and artificial intelligence processing 112, among other components. It is to be understood that each component shown in 100 may comprise one or more components, sub-components, etc.

Components described in system diagram 100 may be executed upon one or more devices 102. In some examples, the components of system diagram 100 may be executed on the same computing device 102 or alternatively across two or more computing devices 102. In some examples, components of system diagram 100 may execute concurrently across one or more computing devices 102. However, in some alternative examples, processing need not be concurrent (e.g., processing may occur sequentially, and data propagated for subsequent processing). A non-limiting example of a computing device 102 is computing system 401 (FIG. 4), where the description of FIG. 4 includes specific examples of computing devices (e.g., laptop, desktop, server, data storage device).

Among other technical advantages, the present disclosure is applicable to train a classifier based on content retrieval using search terms in tenant-specific scenarios, where accurate searching can be executed on content associated with one or more tenant accounts of an application/service (e.g., tenant-specific content search or multi-tenant content search) concurrently in milliseconds even in instances where there may be millions of documents to be searched. As an example, exemplary data shards may be generated and managed for efficient and scalable content retrieval including training of a classifier (e.g., artificial intelligence classifier) that is used for content retrieval processing. Content retrieval referenced herein may pertain to any type of content that may be locally stored or stored through distributed data storages. Examples of content comprise but are not limited to: files/document, entities/entity relationship data; and web-based query results, among other examples.

The classifier training component 104 is configured to execute processing related to generation and management of exemplary data shards that are usable to improve content retrieval processing. Content retrieval processing may be executed through a search algorithm, artificial intelligence processing or any other type of data modeling, among other examples. Exemplary data shards may be created during training of content retrieval processing (e.g., training of artificial intelligence processing such as a machine learning model), used to train a classifier and subsequently used to retrieve content during real-time (or near real-time) search querying. A classifier, as referenced herein, may be implemented as part of artificial intelligence processing that provides accurate and efficient real-time (or near real-time) content retrieval, for example, across large data sets. Processing described herein refers to training of an exemplary classifier and further extends to utilization of a trained classifier during real-time (or near real-time) content retrieval, for example, when a tenant account of an application/service searches for content associated with that tenant account and/or other tenant accounts of an application/service. That is, exemplary processing described herein is applicable to train a classifier and expose the trained classifier during execution of artificial intelligence processing for content retrieval across any type of application/service. Management of exemplary data shards further comprises processing related to memory management during content retrieval processing (training or real-time execution).

An application/service may be any type of programmed software. Examples of applications/services comprise but are not limited to: gaming applications/services; content streaming applications/services; word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/services, directory applications/services, mapping services, calendaring services, electronic payment services, digital data storage or distributed data storage applications/services, web conferencing applications/services, call communication applications/services, language understanding applications/services, bot framework applications/services, networking applications/service, team collaborative applications/services and social networking applications/services, among other examples. In some examples, an exemplary application/service may be integrated into a software application platform providing access to a suite of applications/services. Moreover, specific application/services as well as application platform suites (e.g., software application platform providing correlated access to a plurality of applications/services) may be configured to interface with other non-proprietary application/services (e.g., third-party applications/services) to extend processing described herein.

As referenced in the foregoing description, large data sets may pertain to tenant-specific data managed by one or more applications/services. The present disclosure is applicable to train a classifier for content retrieval in tenant-specific scenarios, where accurate searching can be executed for multiple tenants (e.g., multi-tenant search) concurrently in milliseconds even in instances where there may be millions of documents to be searched. Tenant data stores, storing tenant-specific content, may be managed by a data storage application/service (e.g., a distributed data storage application/service such as a cloud content storage). The tenant data stores may be used by one or more users to store content (e.g., files, documents), for example, in a local or distributed manner. Storage of tenant content and usage of stored tenant content may require software platforms, providing applications/services, to abide by data privacy laws and regulations. For instance, when utilizing tenant content for training purposes, should be executed in according with data usage and retention policies of the software platform without comprising any data privacy laws or regulations. The present disclosure executes operations to generate exemplary data shards and manage the data shards, in memory, for training purposes while abiding by data privacy laws and regulations.

The classifier training component 104 may interface with other components described herein to further execute of processing operations improving content retrieval processing. For instance, the classifier training component 104 interfaces with a data indexing component 106. The data indexing component 106 is configured to generate indexing of content (e.g., files). Indexing is the process of associating or tagging content (e.g., electronic files/documents) with different search terms or metadata to aid execution of search query processing/content retrieval. An index may store a heterogeneous set of files/documents, with any number of different fields that may vary in arbitrary ways to facilitate content lookup and document retrieval. Respective indexes may be a traditional index or an inverted index, among other types of indices known to one skilled in the field of art. Processing for generating indices/indexes are known to one skilled in the field of art. For example, the data indexing component 106 may be associated with a data indexing application/service (e.g., Azure® Search, Lucene®, Apache® SOLR®) that generates indexing for file content.

Above what is known, indexing may be tailored for artificial intelligence processing described herein including training of an artificial intelligence classifier and implementation of a trained artificial intelligence classifier to execute real-time (or near real-time) content retrieval of a search query. The present disclosure may specifically build indexes of file content associated with one or more tenant accounts of an application/service (e.g., data storage application/service). For instance, file content of a tenant account (i.e. tenant) of an application/service may be indexed for content retrieval purposes. While a tenant account may be specific to an application/service it is also understood that the present disclosure further extends to examples where a tenant account operates across a plurality of application/services (e.g., a tenant account of a software platform providing a plurality of applications/services provided by a software provider such as MICROSOFT®).

The classifier training component 104 is configured to interface with the data indexing component 106 to uniquely utilize indexing of content to improve content retrieval processing when working with large data sets. In doing so, the classifier training component 104 directs a data indexing application/service, via the data indexing component 106, to generate indexing for content associated with a one or more tenant accounts. In some cases, a data indexing application/service may have previously generated indexing for file content (e.g., file content of a specific tenant account). In such cases, the classifier training component 106 is configured to retrieve indexing for tenant-specific file content. Some instances of retrieval may require the classifier training component 104 to execute processing operations to parse and filter indexing of file content amongst a plurality of tenant accounts that are managed by a data indexing application/service. In any case, the classifier training component 104 is configured to identify indexing of a plurality of files/documents for a specific tenant account. Indexing may be representative of a large number of files associated with a tenant account where a large number of indexes may also be created for searching file content associated with a tenant account. While a data indexing application/service may be able to identify indexing correlated to specific file content, traditional data indexing applications/services are not configured for applied usage of said indexing, for example, creation of data shards of indexed content.

The classifier training component 104 is further configured to generate, from retrieved indexing of file content, a plurality of data shards usable for training of an artificial intelligence classifier and/or subsequent content retrieval based on a received search query. An exemplary data shard is a data container of a predetermined size (e.g., number of files within and/or container size) that contains indexing that correlates with a randomized sampling of content of a tenant account. In alternative examples, a data shard (or different data shards) may vary in size. For instance, data shards may be created according to a specific rule or designation such as a categorization of content of a specific type (or types).

In generating data shards, manageable-sized representations (e.g., groupings of 1000 files) of data sets are created that are reflective of a normal distribution of documents for a data source (e.g., data storage associated with a tenant account). For training purposes, exemplary data shards are created to be a manageable size such that a data shard is large enough to contain enough randomized data for sufficiently training a classifier while still enabling efficient processing to occur. A data shard may comprise data identifying indexes associated with file content included in a random sampling of tenant file content of a predetermined size (i.e., predetermined number of files included in a data shard). Data associated with data shards, including indexes of a specific data shard, may be mapped into memory (e.g., a memory-mapped IO is used for efficient usage of memory during recall operations such as pre-loading and reading). A plurality of data shards may be created that represent file content associated with a tenant account. For instance, if a user has 5000 documents, five data shards (each having 1000 files) may be created to represent content of a tenant. Similarly, additional groupings of data shards may be created for other tenants, Groupings of data shards may be loaded into memory on the fly to enable tenant-specific training of a classifier and/or subsequent content retrieval during search query processing.

Programmed operations for generation of exemplary data shards and/or data/metadata for on the fly generation and usage of exemplary data shards may be stored in knowledge repositories 110. Knowledge repositories 110 comprise one or more data storages for storage of data and/or metadata to enable processing of the present disclosure to occur. Knowledge repositories 110 may comprise one or more of: physical data storage, virtual data storage or a combination thereof. In addition to storing data for enabling generation of exemplary data shards as well as data associated with exemplary data shards, knowledge repositories 110 may further store tenant content associated with tenant accounts of an application/service as well as data to enable processing to occur by other components described in system diagram 100. For example, knowledge repositories 110 may be configured to store data to enable execution of artificial intelligence processing as well as execution of an artificial intelligence processing application/service.

The classifier training component 104 is configured to execute programmed operations to generate exemplary data shards. Data shards may be generated prior to execution of a search query, which may occur before a user executes a search query via an application/service or even during said application/service execution. Programmed operations may comprise but are not limited to execution of any: programmed code; artificial intelligence processing (e.g., execution of a trained machine learning model); or a combination thereof. For instance, in generating exemplary data shards, the classifier training component may execute processing operations that comprise but are not limited to: identification of content associated with one or more tenant accounts of an application/service; determination of an amount of content that is associated with a specific tenant account; determination of a number of shards (e.g., in a grouping) that should be generated for a specific tenant account; randomizing a selection of file content across data shards created for a tenant account; creating metadata mapping indexed content to a data shard; creating metadata identifying a number of shards to preload during training of a classifier and/or content retrieval processing for a search query, among other examples.

In one example, generating of data shards may comprise identifying a predetermined number of files for a size of each of a plurality of data shards, and randomly selecting, as the randomized sampling, indexes associated with the predetermined number of files from file content of a tenant. In further examples, generating of the plurality of data shards further comprises applying preset rules to create the randomized sampling of the file content. As indicated in the foregoing description, maintaining a randomization of the types of content in a data shard aids training processing to provide the most accurate and efficient trained classifier. Processing that applies preset rules may be utilized to aid generation of data shards including randomization of data in respective data shards and/or groupings of data shards. Preset rules may be set based on any of the above identified processing operations referenced for generation of an exemplary data shard. In one instance preset rule application includes a first rule that identifies a predetermined number of files for a size of a data shard. In further examples, preset rule application may comprise applying a second rule that randomizes file types of the file content represented in the randomized sampling of file content, applies limits/requirements on categorization of content included in a data shard, etc.

System diagram 100 further comprises an exemplary artificial intelligence processing application/service 108. The artificial intelligence processing application/service 108 is configured to execute processing operations related to training of an exemplary classifier for artificial intelligence processing as well as content retrieval processing using a trained classifier. In any case, the artificial intelligence processing application/service 108 is configured to execute artificial intelligence processing 112. For instance, artificial intelligence processing 112 may comprise the application of artificial intelligence data modeling to process a received search query, either in training or in real-time (or near real-time) search processing. Implementation of artificial intelligence processing 112, including generating and maintaining artificial intelligence data modeling, is known to one skilled in the field of art. Exemplary artificial intelligence processing, which is applicable to aid any type of determinative or predictive processing described herein, may be any of: supervised learning; unsupervised learning; semi-supervised learning; or reinforcement learning, among other examples. Examples of supervised learning that may be applied comprise but are not limited to: nearest neighbor processing; naive bayes classification processing; decision trees; linear regression; support vector machines (SVM); and neural networks, among other examples. Examples of unsupervised learning that may be applied comprise but are not limited to: application of clustering processing including k-means for clustering problems, hierarchical clustering, mixture modeling, etc.; application of association rule learning; application of latent variable modeling; anomaly detection; and neural network processing, among other examples. Examples of semi-supervised learning that may be applied comprise but are not limited to: assumption determination processing; generative modeling; low-density separation processing and graph-based method processing, among other examples. Examples of reinforcement learning that may be applied comprise but are not limited to: value-based processing; policy-based processing; and model-based processing, among other examples. In some examples, the artificial intelligence processing may be configured to apply a ranker to determine a best possible result to output based on ranking/scoring processing. For instance, a highest ranking/scored output (or outputs) of the artificial intelligence processing may be utilized to return and/or order content retrieval results for a search query. Ranking/scoring processing is known to one skilled in the field of art.

Above what is known, artificial intelligence processing 112 may be configured to execute one or more rounds of training to train a classifier for content retrieval. Furthermore, artificial intelligence processing 112 may be further configured to receive and process a search query to execute a search of tenant-specific content for a received search query. Moreover, additional points of novelty extend to those where artificial intelligence processing 112 is configured to work with generated data shards, during execution, to improve processing efficiency, accuracy (and reduce latency), among other technical benefits. In order to train and manage artificial intelligence processing 112, the classifier training component 104 interfaces with the artificial intelligence processing application/service 108 and further executes processing subsequently described.

In one example, the classifier training component 104 executes an application programming interface (API) that enables communication between the classifier training component 104 and the artificial intelligence processing application/service 108. An exemplary API may be specifically configured to on-board/load data associated with generated data shards onto memory of a computing device (or computing devices) that executes artificial intelligence processing 112. Such processing may save time, reduce latency and improving processing efficiency during execution of the artificial intelligence processing 112. Exemplary on-boarding/loading comprises instances where data associated with generated data shards may be pre-loaded into a memory (volatile or non-volatile) of a computing device that executes artificial intelligence processing 112 prior to execution of the artificial intelligence processing. This may occur in technical instances such as before or after an artificial intelligence processing application/service 108 is launched. The classification training component, through said API, is configured to detect a trigger for preloading of data associated with generated data shards into memory before that data is needed for execution (e.g., before training or content retrieval processing commences). Examples of triggers for on-boarding of data associated with generated data shards comprises but is not limited to: when a user logs into a computing device executing the artificial intelligence processing application/service 108; when a training/sampling session is initiated, through the artificial intelligence processing application/service 108, for training of an exemplary classifier; upon initial interaction with a GUI prompt for entering a search query through the artificial intelligence processing application/service 108; and upon receipt of a search query, among other examples.

In further examples, the classifier training component 104 is further configured to generate a processing queue that is configured to manage on-boarding and/or reading of exemplary data shards relative to execution of artificial intelligence processing 112. As an example, the processing queue may order a plurality of groupings of data shards for processing during execution of rounds of training of the artificial intelligence processing 112 and/or rounds of execution of content retrieval. In some examples, a round of artificial intelligence processing 112 is specific to data shards of a specific tenant account. For instance, a grouping of a plurality of data shards for a tenant account may be pre-loaded into memory to enhance training and/or execution of content retrieval processing, where the processing queue may manage when data associated with groupings of data shards are sent to and read from memory. As an example, a first grouping, comprising a plurality of data shards for a first tenant account, is pre-loaded and read into memory to return tenant-specific content for a received search query. When that first grouping is read from the memory, the classifier training component 104 may be configured to utilize the processing queue to automatically pre-load a second grouping of data shards that may pertain to a second tenant account. This process may be iteratively executed, for example, to enable multi-tenant training/cross-training of an exemplary classifier. While some examples described herein reference a tenant-specific grouping of data shards, it is to be understood that examples of the present disclosure may further extend to technical instances where a plurality of data shards being utilizes comprises data shards across multiple tenant accounts.

Moreover, the classifier training component 104 may be further configured to execute load balancing processing to manage computing resources allocated to execution of training and/or content retrieval using an exemplary classifier. This may further improve processing efficiency during technical scenarios described herein. For instance, the classifier training component 104 is configured to determine a number/amount of data shards to be processed concurrently and/or a number of rounds of training/content retrieval processing to occur. Such data may be utilized to identify an amount of computing resources that may be required to complete processing within a predetermined amount of time. This may further reduce latency during operation. Load balancing processing may comprise determining computing resources to allocate to processing including but not limited to: physical computing devices/data storage devices, virtual machines and/or memory, and a combination thereof. Load balancing processing may further comprise management of sticky sessions or non-sticky sessions. For instance, if processing has already begun using data shards associated with a specific tenant, the classifier training component 104 may execute a determination to keep processing as a sticky session that utilizes the same computing resource to finish processing of that grouping of data shards. In other cases, the same computing resources may be utilized such as when an artificial intelligence model has already been loaded for execution on a respective computing device. In alternative examples, the classifier training component 104 is configured to randomize computing resources applied during training/content retrieval processing (e.g., create a non-sticky session). This may help improve processing efficiency and reduce latency, for example, when the volume of requests for processing increases.

The classifier training component 104 further interfaces with the artificial intelligence processing application/service 108 to enable data shards to be read from memory for execution of artificial intelligence processing 112. For instance, the plurality of data shards (one or more groupings thereof) may be read from memory to execute classifier training and/or real-time (or near real-time) content retrieval. This may occur in response to processing of a received search query, either in training or during real-time (near real-time) content retrieval processing. In some alternative examples, training processing may not require a developer to enter a specific search query to enable training processing. Instead, a sampling session may be executed that is configured to execute processing to run through different types of classifications and/or content identification based on an identified user intent. Artificial intelligence processing may leverage a plurality of resources (e.g., entity relationship identification, user intent identification available via a software platform). In at least one example, reading of data shards may occur in a randomized order. For instance, a processing queue identifies a plurality of data shards to be processed, where the classifier training component 104 is configured to randomize an order that the data shards are read for processing to improve training. In further examples, more than one data shard may be processed in parallel. This may be possible through load balancing, which may optimize a configuration for the quickest and most efficient processing.

Furthermore, usage of user data may be managed in a manner that accounts for privacy concerns. In one example, data shards may be read for processing during an active online session of a user to avoid any potential misuse with respect to usage of user data in offline scenarios. In other examples, training and/or content retrieval processing may occur offline, for example, in instances that comply with user consent.

Training processing may comprise searching indexing across one or more data shards to retrieve content for a received search query (or classification). In one example, labeling for content retrieval results may be provided for confirmation by a user to confirm the classification class identified by the classifier. In other examples, retrieved content results may be provided for a user to review and enter labeling/classify the retrieved content results so that the classifier can learn from said labeling. With respect to execution of training processing, an exemplary classifier training component 104 may be configured to execute training processing a predetermined number of times using a same grouping of data shards (e.g., repeating tenant-specific training). As labeling and classification may be somewhat subjective, execution of multiple rounds of training using the same groupings of data shards may assist with optimizing a classifier for real-time execution. In one example, a threshold may be set that requires a number of training sessions to have occurred (e.g., using created data shards) before a classifier can be considered as appropriately trained. Alternatively or additionally, a predetermined number of developers may be required to execute training processing using a grouping of data shards before training is considered complete. Again, this may assist with minimizing subjectivity of training processing to better optimize a trained classifier.

Once a classifier is sufficiently trained, the artificial intelligence processing application/service 108 is configured to expose artificial intelligence processing 112 (having a trained classifier) for subsequent processing. Subsequent processing may comprise any of: real-time (or near real-time) processing of a search query to retrieve content for the search query or subsequent training of a classifier used for content retrieval processing.

Figure 2:
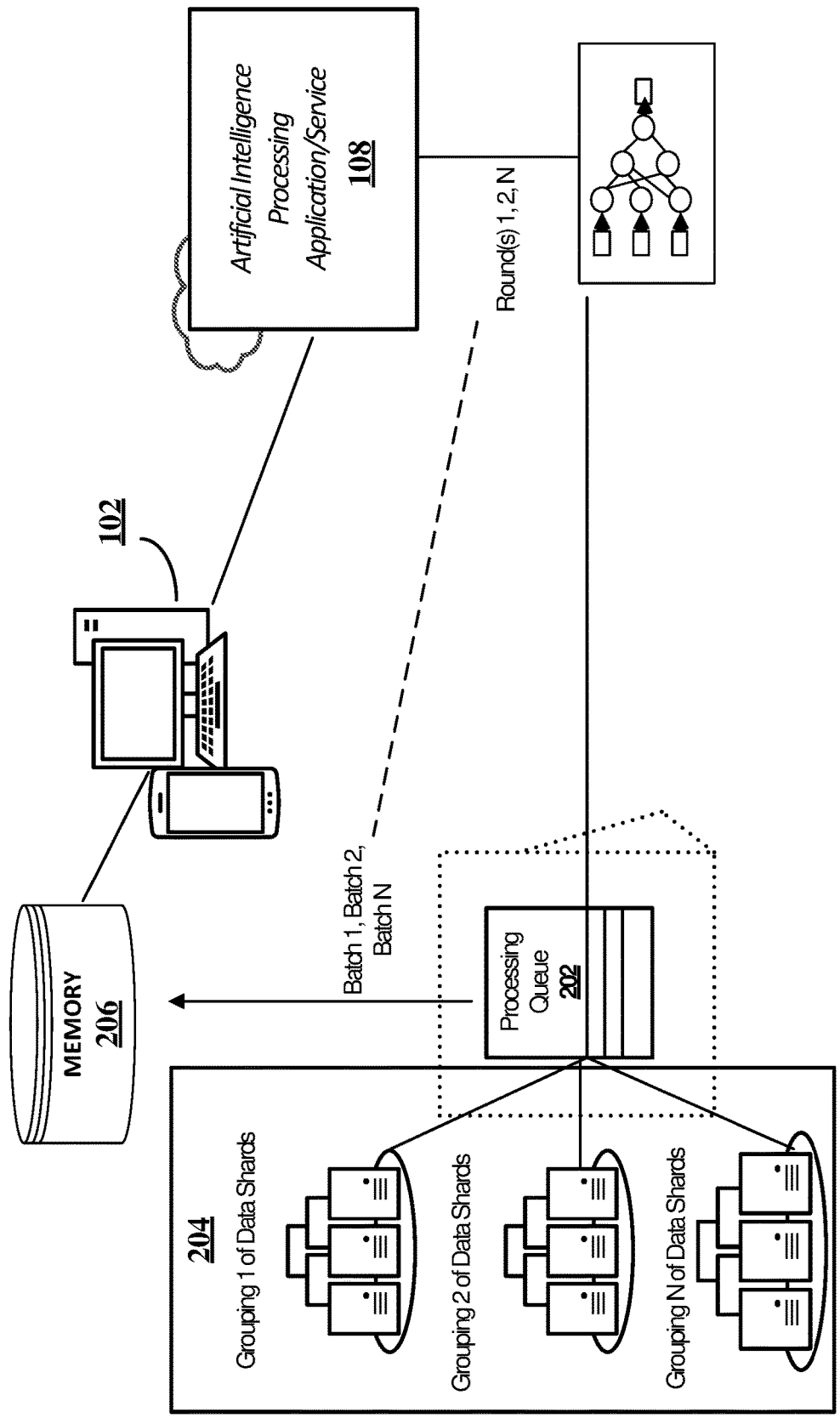
FIG. 2 illustrates an exemplary system diagram for reading exemplary data shards (or groupings thereof) during execution of training of a classifier and/or content retrieval processing, with which aspects of the present disclosure may be practiced.

FIG. 2 illustrates an exemplary system diagram 200 for reading exemplary data shards (or groupings thereof) during execution of training of a classifier and/or content retrieval processing. System diagram 200 provides a non-limiting illustrative example of processing described in system diagram 100 (FIG. 1), where data shards may be utilized during execution of artificial intelligence processing that is configured for content retrieval. System diagram 200 illustrates the execution of artificial intelligence processing, by an exemplary artificial intelligence processing application/service 108 on one or more computing devices 102. As referenced in the foregoing description, data associated with a plurality of data shards may be read into a memory 206 of the one or more computing devices 102. Triggers for preloading data associated with a data shard into the memory 206 as well as reading of said data from the memory 206 have been described in the foregoing description.

Furthermore, description of an exemplary processing queue 202 has been provided in the foregoing description including the description of system diagram 100 (FIG. 1). Processing queue 202 is configured to manage on-boarding and/or reading of exemplary data shards relative to execution of artificial intelligence processing. The processing queue 202 may order a plurality of groupings of data shards for processing during execution of rounds of training of the artificial intelligence processing and/or rounds of execution of content retrieval. In some examples, a round of artificial intelligence processing is specific to data shards that are specific to a tenant account.

In the example shown in system diagram 200, groupings of data shards 204 (e.g., grouping 1, 2, N) may be generated and managed by the processing queue 202. As an example, a first grouping of the groupings of data shards 204 may comprise a plurality of data shards for a first tenant account, a second grouping comprising a plurality of data shards for a second tenant account, etc. The processing queue 202 is configured to manage loading and reading of the groupings of data shards 204, for example, based on the processing determinations described in the foregoing description (e.g., the type of processing being executed, the amount of data shards to be processed, load balancing configuration). The processing queue 202 may comprise data that enables the one or more groupings of data shards 204 to be generated on the fly or retrieved from memory and propagated to memory 206 for artificial intelligence processing as described herein. One or more rounds of artificial intelligence processing may be executed that may process the groupings of data shards 204 in batches (e.g., batch 1, batch 2, batch N). A round of training or content retrieval processing may process one or more of the groupings of data shards 204 as a batch. Groupings of data shards 204 may be processed sequentially, iteratively or in parallel.

FIG. 3 illustrates an exemplary method 300 related to generation and management of data shards (or groupings thereof) that are usable for content retrieval processing as described herein, with which aspects of the present disclosure may be practiced. As an example, method 300 may be executed across an exemplary computing system 401 (or computing systems) as described in the description of FIG. 4. Exemplary components, described in method 300, may be hardware and/or software components, which are programmed to execute processing operations described herein. Non-limiting examples of components for execution of processing operations described herein have been referenced in other portions of this Specification, including system diagram 100 (FIG. 1), system diagram 200 (FIG. 2), and FIG. 4. Operations performed in method 300 may correspond to operations executed by a system and/or service that execute computer programs, software agents, intelligent bots, APIs, plugins, artificial intelligence including neural networks and/or machine-learning processing, among other examples. In some examples, processing operations described in method 300 may be executed by one or more applications/services associated with a web service that has access to a plurality of application/services, devices, knowledge resources, etc. In one instance, processing operations described in method 300 may be implemented by one or more components connected over a distributed network.

Method 300 begins at processing operation 302, where indexing of file content is retrieved for subsequent processing. Exemplary file content may be file content associated with one or more tenant accounts of an application/service. Processing operations related to retrieval of indexing of file content have been described in the foregoing description including the description of system diagram 100 (FIG. 1). For instance, a classifier training component (104 of FIG. 1) may interface with a data indexing component (106 of FIG. 1) to obtain access to an indexing of file content. In some examples, a data indexing application/service may be utilized to generate indexing for file content. In other instances, indexing of file content may be generated on the fly to enable creation of exemplary data shards as described herein.

Flow of method 300 may proceed to processing operation 304. At processing operation 304, data shards are generated for training of an artificial intelligence classifier that is configured for content retrieval processing. Processing operations related to generation of exemplary data shards have been described in the foregoing description including the description of system diagram 100 (FIG. 1). Definitions and examples of data shards have been provided in the foregoing description. In one example, a data shard is a data container of a predetermined size that contains indexing that correlates with a randomized sampling of content of a tenant account. In generating data shards, manageable-sized representations of data sets are created that are reflective of a normal distribution of documents for a data source. A plurality of data shards may be created that represent file content associated with a tenant account. Groupings of data shards may be created for tenants, which are loaded into memory on the fly to enable tenant-specific training of a classifier.

In some examples, flow of method 300 may proceed to generate (or update) a processing queue that is used for ordering generated data shards for subsequent training processing for training a classifier (e.g., artificial intelligence classifier) and/or content retrieval processing. Processing operations related to retrieval of indexing of file content have been described in the foregoing description including the description of system diagrams 100 (FIG. 1) and 200 (FIG. 2). An exemplary processing queue may be concurrently managed during execution of artificial intelligence processing to utilize data shards for training and/or content retrieval.

At processing operation 308, an API may be launched to interface with an artificial intelligence processing application/service thereby enabling implementation of generated data shards to aid in training processing and/or real-time (or near real-time) content retrieval processing. As an example, an exemplary classifier training component (104 of FIG. 1) and/or an application/service configured to execute processing operations described therein may be utilized to execute an API for interfacing with an artificial intelligence processing application/service. Processing operations related to interfacing between an exemplary classifier training component and an artificial intelligence processing application/service have been described in the foregoing description including the description of system diagram 100 (FIG. 1). Moreover, a described API may be further configured to communicate with other applications/services, for example, to foster search query processing that may be a trigger for execution of processing operations described in the present disclosure. In any case, the API is utilized to establish a connection with the artificial intelligence processing application/service to enable training and/or other content retrieval processing.

Once a connection is established with the artificial intelligence processing application/service, flow of method 300 may proceed to processing operation 310. At processing operation 310, data associated with one or more of the generated data shards may be preloaded into memory for training of said classifier (e.g., artificial intelligence classifier). Processing related to preloading of data shards into memory has been described in the foregoing description including the description of system diagram 100 (FIG. 1). As an example, processing operation 310 comprises preloading, prior to executing of the training of an artificial intelligence classifier, a plurality of groupings of training shards into a memory of a computing device that is configured to execute the training of the artificial intelligence classifier. In at least one instance, the preloading (processing operation 310) preloads the plurality of groupings of training shards into the memory based on an ordering provided by the processing queue. As referenced in the foregoing description, data shards may be read from memory to correlate with rounds of training processing. In some examples, a plurality of groups of data shards may be preloaded into memory to streamline subsequent content retrieval processing, where the processing queue may be utilized to indicate when specific groups of data shards may be read out from the memory. In other examples, the processing queue may preload a group of data shards one at a time. Furthermore, the foregoing description provides indications of triggers that result in automatic occurrence of preloading of data shards. For example, preloading (processing operation 310) automatically occurs based on a detection of user access to an artificial intelligence processing application or service that is configured for the training of the artificial intelligence classifier. In another example, preloading (processing operation 310) automatically occurs based on initiation of a sampling session for training a classifier or the detection of a search query, entered into a user interface of an artificial intelligence processing application or service, that is used for the training of the artificial intelligence classifier.

Method 300 may proceed to processing operation 312. At processing operation 312, exemplary data shards are read from the memory during execution of artificial intelligence processing to train an exemplary classifier. That is, the artificial intelligence processing application/service is configured to execute one or more rounds of training of an artificial intelligence classifier. Non-limiting examples of triggers to initiate reading of data associated with data shards from memory have been described in the foregoing description including the description of system diagram 100 (FIG. 1). In one example, a search query data may be processed, providing a trigger for reading of data associated with data shards from memory. For example, a search query may be received through the artificial intelligence processing application/service (or another interfacing application/service) to initiate a training session. In another example, search query data may be retrieved (e.g., query log data stored from previous user search queries) and utilized to execute one or more rounds of training processing. In any case, one or more rounds of training of an artificial intelligence classifier may be executed based on search queries and a plurality of data shards. Data shards may be read from the memory to correlate with the rounds of training processing occurring through artificial intelligence processing application/service.

Once one or more rounds of training processing have occurred, flow of method 300 may proceed to processing operation 314. At processing operation 314, the classifier (e.g., artificial intelligence classifier) is trained based on results of the training processing. For instance, artificial intelligence processing may be a trained data model (e.g., machine learning model) that automatically adapts based on content retrieval results (e.g., classification of content/documents and/or user feedback regarding accuracy of content classification). Operations for updating of a data model based on training processing is known to one skilled in the field of art.

After a round of training has been executed, flow of method 300 may proceed to decision operation 316, where it is determined whether additional rounds of training processing are to occur. In examples where additional rounds of training are to occur, flow of decision operation 316 branches YES, and processing of method 300 returns back to processing operation 310 to initiate training using additional data shards. In examples where additional training rounds are not to occur, flow of decision operation 316 branches NO, and processing of method 300 proceeds to processing operation 318.

At processing operation 318, artificial intelligence processing comprising the updated artificial intelligence classifier is exposed. For instance, the artificial intelligence processing application/service may interface with a plurality of applications/services that provide front-end search query processing. Those applications/services interface with the artificial intelligence processing application/service, which executes back-end processing of content retrieval, for a received search query using the updated classifier (e.g., trained artificial intelligence classifier).

Exposure (processing operation 318) of the trained classifier (e.g., updated artificial intelligence data modeling) may comprise the receipt of subsequent search queries to utilize updated modeling to execute real-time (or near real-time) content retrieval processing. In subsequent content retrieval processing examples, the plurality of data shards may be pre-loaded into memory to improve efficiency during execution of content retrieval processing. For instance, data associated with created data shards may be stored for subsequent recall during content retrieval processing. When a user is executing an application/service that may require content retrieval, this may be a trigger to recall or generate/regenerate data shards for content retrieval processing. As such, data shards can be generated and/or loaded on the fly so that when the user enters a search query, the content retrieval results are efficiently and accurately returned. In examples where new content is added to a tenant account, data shards may either be regenerated or modified/reconfigured based on processing operations described herein. Developers may apply one or more present rules, as described in the foregoing, which may determine whether data shards should be regenerated fully or modified to maintain randomization amongst generated data shards.

FIG. 4 illustrates a computing system 401 suitable for implementing processing operations described herein related to content retrieval processing using exemplary data shards (or groupings thereof) as described herein, with which aspects of the present disclosure may be practiced. Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, a processing system 402, a storage system 403, software 405, communication interface system 407, and user interface system 409. Processing system 402 is operatively coupled with storage system 403, communication interface system 407, and user interface system 409. Non-limiting examples of computer system 401 comprise but are not limited to: smart phones, laptops, tablets, PDAs, desktop computers, servers, data storage devices, smart computing devices including television devices and wearable computing devices, e-reader devices, gaming consoles and conferencing systems, among other non-limiting examples.

Processing system 402 loads and executes software 405 from storage system 403. Software 405 includes one or more software components (e.g., 406a and 406b) that are configured to enable functionality described herein. In some examples, computing system 401 (or multiple computing systems) may be utilized to concurrently execute one or more exemplary components described herein such as a data indexing component, a classifier training component, an artificial intelligence processing application/service (or component thereof). When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity. Computing system 401 may further be utilized to execute exemplary system diagram 100 (FIG. 1), system diagram 200 (FIG. 2) as well as method 300 (FIG. 3).

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, microprocessors, graphical processing units, application specific processors, sound cards, speakers and logic devices, gaming devices as well as any other type of processing devices, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for executing content retrieval components 406a as described herein. Content retrieval components 406a comprise but are not limited to any components described in the foregoing description related to training of artificial intelligence processing for content retrieval as well as execution of content retrieval processing of a search query using a trained classifier. Non-limiting examples of content retrieval classification components 406a comprise but are not limited to: a data indexing component; a classifier training component; an artificial intelligence processing component (e.g., executing an artificial intelligence processing); knowledge repositories component for training of artificial intelligence processing; and a component for artificial intelligence processing for content retrieval, among other examples. Software 405 may further comprise application/service component(s) 406b that enable execution of applications/services providing functionality of other components described herein. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process data and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, satellites, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, gaming accessories (e.g., controllers and/or headsets) and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. For example, an exemplary user interface/GUI may be provided to enable a developer to train a classifier configured for content retrieval processing or a GUI that enables users to execute content retrieval processing (e.g., providing a search query and receiving content retrieval results for the search query). Among other examples, a GUI may be configured for tenant-specific search queries and content retrieval. Separately or in conjunction with each other and other hardware and software elements, the user interface software and user interface devices may support a graphical user interface, a natural user interface, or any other type of user interface, for example, that enables front-end processing of exemplary application/services identified in the foregoing. User interface system 409 comprises a graphical user interface that presents graphical user interface elements representative of any point in the processing described in the foregoing description including processing operations described in system diagram 100 (FIG. 1), system diagram 200 (FIG. 2) and method 300 (FIG. 3). A graphical user interface of user interface system 409 may further be configured to display graphical user interface elements (e.g., data fields, menus, links, graphs, charts, data correlation representations and identifiers, etc.) that are representations generated from processing described in the foregoing description. Exemplary applications/services may further be configured to interface with processing components of computing device 401 that enable output of other types of signals (e.g., alerts and monitoring) in conjunction with operation of exemplary applications/services described herein.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPV6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), Bluetooth, infrared, RF, cellular networks, satellite networks, global positioning systems, as well as any other suitable communication protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method, comprising:
pre-loading, into a memory, data shards comprising a plurality of indexes from indexing file content representative of a randomized sampling of the file content;
receiving a search query for searching the file content from a user via a user interface of a cloud-based service;
processing the search query with a trained artificial intelligence classifier trained to search indexing across the data shards to retrieve content responsive to the search query;
reading, from the memory, the data shards during the processing the search query by the trained artificial intelligence classifier; and
providing the content responsive to the search query.

2. The method of claim 1, further comprising:
detecting the user is accessing the cloud-based service, wherein the pre-loading the data shards is in response to the detecting.

3. The method of claim 1, further comprising:
generating the data shards.

4. The method of claim 3, wherein the generating the data shards comprises:
identifying a predetermined number of files for a size of each of the data shards, and randomly selecting, as the randomized sampling, indexes associated with the predetermined number of files from the file content.

5. The method of claim 1, wherein:
the cloud-based service is a multi-tenant cloud-based service;
the user is a tenant of the multi-tenant cloud-based service; and
the data shards are data shards containing data specific to the tenant.

6. The method of claim 1, further comprising:
generating a processing queue that groups the data shards for processing during content retrieval.

7. The method of claim 6, wherein:
the cloud-based service is a multi-tenant cloud-based service; and
the processing queue groups the data shards into tenant-specific data shards.

8. The method of claim 1, further comprising:
determining a number of data shards to be processed concurrently during rounds of content retrieval processing; and
load balancing by determining computing resources to allocate based on the number of data shards for a given round of content retrieval.

9. The method of claim 1, wherein the reading the data shards comprises reading the data shards in a randomized order.

10. A system, comprising:
one or more processors; and
a memory having stored thereon instructions that, upon execution by the one or more processors, cause the one or more processors to:
pre-load, into the memory, data shards comprising a plurality of indexes from indexing file content representative of a randomized sampling of the file content;
receive a search query for searching the file content from a user via a user interface of a cloud-based service;

process the search query with a trained artificial intelligence classifier trained to search indexing across the data shards to retrieve content responsive to the search query;

read, from the memory, the data shards during the processing the search query by the trained artificial intelligence classifier; and providing the content responsive to the search query.

11. The system of claim 10, wherein the instructions comprise further instructions that, upon execution by the one or more processors, cause the one or more processors to:
detect the user is accessing the cloud-based service, wherein the pre-loading the data shards is in response to the detecting.

12. The system of claim 10, wherein the instructions comprise further instructions that, upon execution by the one or more processors, cause the one or more processors to:
generate the data shards.

13. The system of claim 12, wherein the instructions to generate the data shards comprises further instructions that, upon execution by the one or more processors, cause the one or more processors to:
identify a predetermined number of files for a size of each of the data shards, and randomly selecting, as the randomized sampling, indexes associated with the predetermined number of files from the file content.

14. The system of claim 10, wherein:
the cloud-based service is a multi-tenant cloud-based service;
the user is a tenant of the multi-tenant cloud-based service; and
the data shards are data shards containing data specific to the tenant.

15. The system of claim 10, wherein the instructions comprise further instructions that, upon execution by the one or more processors, cause the one or more processors to:
generate a processing queue that groups the data shards for processing during content retrieval.

16. The system of claim 15, wherein:
the cloud-based service is a multi-tenant cloud-based service; and
the processing queue groups the data shards into tenant-specific data shards.

17. The system of claim 10, wherein the instructions comprise further instructions that, upon execution by the one or more processors, cause the one or more processors to:
determine a number of data shards to be processed concurrently during rounds of content retrieval processing; and
load balance by determining computing resources to allocate based on the number of data shards for a given round of content retrieval.

18. The system of claim 10, wherein the reading the data shards comprises reading the data shards in a randomized order.

19. A computer-readable memory device having stored thereon instructions that, upon execution by one or more processors, cause the one or more processors to:
pre-load, into a memory, data shards comprising a plurality of indexes from indexing file content representative of a randomized sampling of the file content;
receive a search query for searching the file content from a user via a user interface of a cloud-based service;
process the search query with a trained artificial intelligence classifier trained to search indexing across the data shards to retrieve content responsive to the search query;
read, from the memory, the data shards during the processing the search query by the trained artificial intelligence classifier; and
providing the content responsive to the search query.

20. The computer-readable memory device of claim 19, wherein the instructions comprise further instructions that, upon execution by the one or more processors, cause the one or more processors to:
detect the user is executing the service, wherein the pre-loading the data shards is in response to the detecting.

* * * * *